(12) United States Patent
Li et al.

(10) Patent No.: US 7,751,640 B2
(45) Date of Patent: Jul. 6, 2010

(54) IMAGE PROCESSING METHOD, IMAGE PROCESSING APPARATUS, AND COMPUTER-READABLE RECORDING MEDIUM STORING IMAGE PROCESSING PROGRAM

(75) Inventors: Yuanzhong Li, Kanagawa-ken (JP); Wataru Ito, Kanagawa-ken (JP)

(73) Assignee: Fujifilm Corporation (JP)

( * ) Notice: Subject to any disclaimer, the term of this patent is extended or adjusted under 35 U.S.C. 154(b) by 952 days.

(21) Appl. No.: 11/527,601

(22) Filed: Sep. 27, 2006

(65) Prior Publication Data

US 2007/0070440 A1 Mar. 29, 2007

(30) Foreign Application Priority Data

Sep. 27, 2005 (JP) .............................. 2005/280306

(51) Int. Cl.
*G06K 9/40* (2006.01)
*H04N 1/40* (2006.01)

(52) U.S. Cl. ..................... 382/254; 382/263; 358/448

(58) Field of Classification Search ................ 382/254, 382/260, 263, 266, 275, 162, 167; 358/3.26, 358/3.27, 447, 448, 463
See application file for complete search history.

(56) References Cited

U.S. PATENT DOCUMENTS 5,739,922 A 4/1998 Matama
6,724,942 B1 * 4/2004 Arai ........................... 382/254
6,801,339 B1 * 10/2004 Ito ............................. 358/3.26
6,856,704 B1 * 2/2005 Gallagher et al. ........... 382/263
2003/0231324 A1 * 12/2003 Kagaya ....................... 358/1.9

OTHER PUBLICATIONS

T.F. Cootes et al, "Active Appearance Models", Proc. European Conference on Computer Vision, vol. 2, pp. 484-498, 1998.

* cited by examiner

*Primary Examiner*—Yon Couso
(74) *Attorney, Agent, or Firm*—Studebaker & Brackett PC; Donald R. Studebaker

(57) ABSTRACT

Sharpness is adjusted for more appropriately representing a predetermined structure in an image. A parameter acquisition unit obtains a weighting parameter for a principal component representing a degree of sharpness in a face region detected by a face detection unit as an example of the predetermined structure in the image, by fitting to the face region a mathematical model generated by a statistical method such as AAM based on a plurality of sample images representing human faces in different degrees of sharpness. Based on a value of the parameter, sharpness is adjusted in at least a part of the image. For example, a parameter changing unit changes the value of the parameter to a preset optimal face sharpness value, and an image reconstruction unit reconstructs the image based on the parameter having been changed and outputs the image having been subjected to the sharpness adjustment processing.

12 Claims, 9 Drawing Sheets

FIG.8
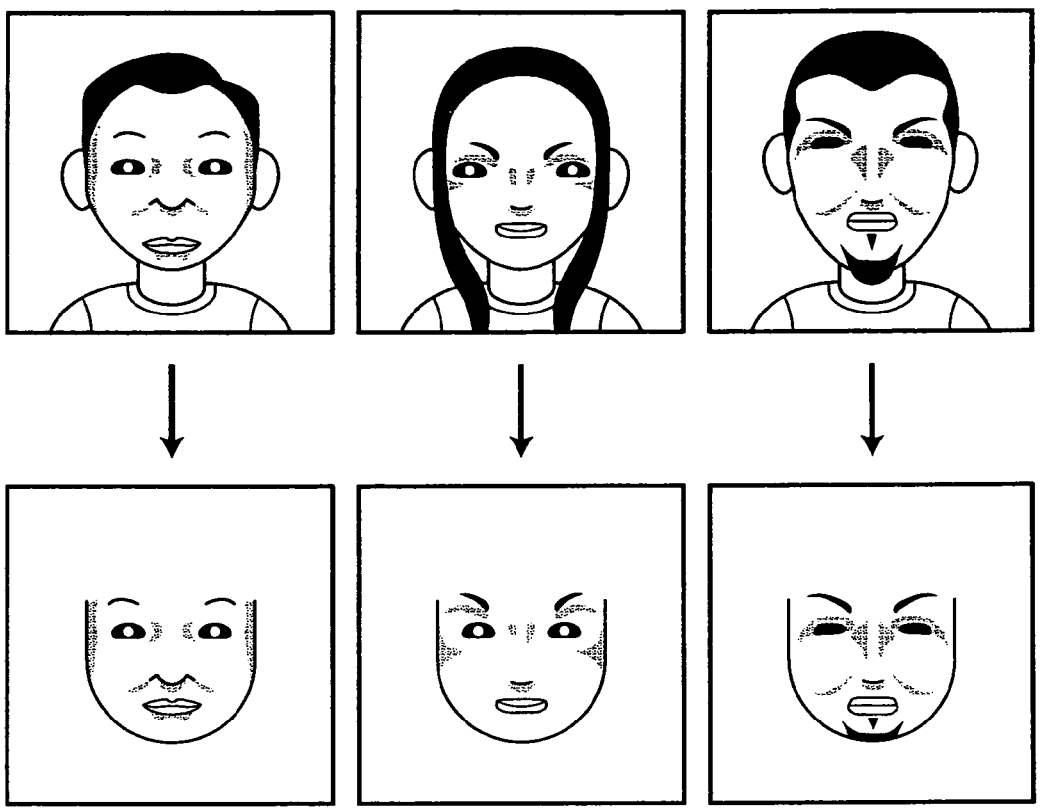
FIG.9
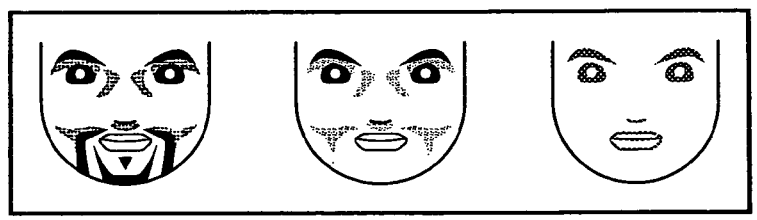
THE $i_1^{TH}$ PRINCIPAL COMPONENT
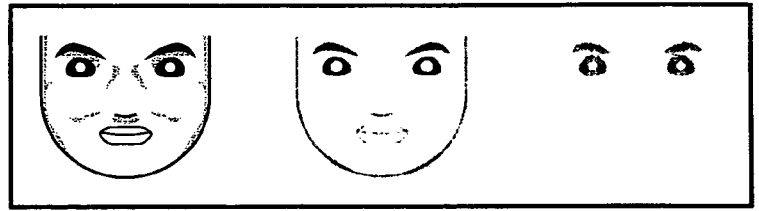
THE $i_2^{TH}$ PRINCIPAL COMPONENT

IMAGE PROCESSING METHOD, IMAGE PROCESSING APPARATUS, AND COMPUTER-READABLE RECORDING MEDIUM STORING IMAGE PROCESSING PROGRAM

BACKGROUND OF THE INVENTION

1. Field of the Invention

The present invention relates to a method and an apparatus for carrying out image processing that adjusts sharpness of an input image. The present invention also relates to a computer-readable recording medium storing a program that causes a computer to execute the method.

2. Description of the Related Art

There are known image processing methods for emphasizing outlines of subjects in photograph images and for correcting out-of-focus blurs therein, by adjusting sharpness thereof.

For example, a method for obtaining processed image data after carrying out enhancement/reduction processing is known (see U.S. Pat. No. 5,739,922). In the enhancement/reduction processing of this method, image data are decomposed into low frequency components, medium frequency components, and high frequency components, and the high frequency components affecting sharpness of a reproduced image are enhanced while the medium frequency components representing film graininess appearing as granularity in the reproduced image are suppressed. The frequency components after the processing and the low frequency components are combined to generate the processed image data.

However, the sharpness enhancement processing described in U.S. Pat. No. 5,739,922 is realized by enhancing only the specific frequency components, and is not carried out by recognizing main subjects in images. Consequently, a degree of sharpness enhancement is not necessarily optimal therefor. For example, in the case where high frequency components as a target of sharpness enhancement processing include frequency components of edges in the background which is blurrier than a main subject while the degree of sharpness enhancement is determined based on the frequency components of the edges in the background, the sharpness of faces becomes too enhanced as a result of the processing.

SUMMARY OF THE INVENTION

The present invention has been conceived based on consideration of the above circumstances. An object of the present invention is therefore to provide an image processing method, an image processing apparatus, and a computer-readable recording medium storing an image processing program for adjusting sharpness so as to enable more appropriate representation of a predetermined structure in an image.

A method of image processing of the present invention comprises the steps of:

obtaining a weighting parameter for a statistical characteristic quantity representing a degree of sharpness in a predetermined structure in an input image by fitting a model representing the structure to the structure in the input image, the model obtained by carrying out predetermined statistical processing on a plurality of images representing the predetermined structure in different degrees of sharpness, and the model representing the structure by one or more statistical characteristic quantities including the statistical characteristic quantity representing the degree of sharpness and by weighting parameter or parameters for weighting the statistical characteristic quantity or quantities according to an individual characteristic of the structure; and adjusting sharpness in at least a part of in the input image according to a value of the weighting parameter obtained.

An image processing apparatus of the present invention is an apparatus for carrying out the image processing described above. More specifically, the image processing apparatus comprises:

parameter acquisition means for obtaining a weighting parameter for a statistical characteristic quantity representing a degree of sharpness in a predetermined structure in an input image by fitting a model representing the structure to the structure in the input image, the model obtained by carrying out predetermined statistical processing on a plurality of images representing the predetermined structure in different degrees of sharpness, and the model representing the structure by one or more statistical characteristic quantities including the statistical characteristic quantity representing the degree of sharpness and by weighting parameter or parameters for weighting the statistical characteristic quantity or quantities according to an individual characteristic of the structure; and sharpness adjustment means for adjusting sharpness in at least a part of the input image according to a value of the weighting parameter obtained by the parameter acquisition means.

A computer-readable recording medium of the present invention stores a program that causes a computer to execute the method of the image processing (that is, a program that causes a computer to function as the means described above).

Hereinafter, the image processing apparatus, the image processing method, and the image processing program of the present invention will be described in detail.

As a method of generating the model representing the predetermined structure in the present invention, a method of AAM (Active Appearance Model) can be used. An AAM is one of the approaches in interpretation of the content of an image by using a model. For example, in the case where a human face is a target of interpretation, a mathematical model of human face is generated by carrying out principal component analysis on face shapes in a plurality of images to be learned and on information of luminance after normalization of the shapes. A face in a new input image is then represented by principal components in the mathematical model and corresponding weighting parameters, for face image reconstruction (T. F. Cootes et al., "Active Appearance Models", Proc. European Conference on Computer Vision, vol. 2, pp. 484-498, 1998,; hereinafter referred to as Reference 1).

The degree of sharpness refers to how sharp an image is. More specifically, the degree may vary from a state of an emphasized outline to a state of a blurry outline. Therefore, the sharpness adjustment processing in the present invention includes processing for ordinarily emphasizing or softening an outline in a photographed image and correction of blur therein. Furthermore, the sharpness adjustment processing can include processing for portrait effect that blurs the background of an image of a person as will be described later.

It is preferable for the predetermined structure to be suitable for modeling. In other words, variations in shape and luminance of the predetermined structure in images thereof preferably fall within a predetermined range. Especially, it is preferable for the predetermined structure to generate the statistical characteristic quantity or quantities contributing more to the shape and luminance thereof through the statistical processing thereon. Furthermore, it is preferable for the predetermined structure to be a main part of an image. More specifically, the predetermined structure can be a human face.

The plurality of images representing the predetermined structure in different degrees of sharpness may be images obtained by actually photographing the predetermined structure in different degrees of sharpness. Alternatively, the images may be generated through simulation based on an image of the structure photographed in a specific degree of sharpness.

It is preferable for the predetermined statistical processing to be dimension reduction processing that can represent the predetermined structure by the statistical characteristic quantity or quantities of fewer dimensions than the number of pixels representing the predetermined structure. More specifically, the predetermined statistical processing may be multivariate analysis such as principal component analysis. In the case where principal component analysis is carried out as the predetermined statistical processing, the statistical characteristic quantity or quantities refers/refer to principal components obtained through the principal component analysis.

In the case where the predetermined statistical processing is principal component analysis, principal components of higher orders contribute more to the shape and luminance than principal components of lower orders.

In the statistical characteristic quantity or quantities, at least information based on luminance of the structure needs to be represented, since the degree of sharpness is represented by distribution of luminance.

The statistical characteristic quantity representing the degree of sharpness may be a single statistical characteristic quantity or a plurality of statistical characteristic quantities.

The (predetermined) structure in the input image may be detected automatically or manually. In addition, the present invention may further comprise the step (or means) for detecting the structure in the input image. Alternatively, the structure may have been detected in the input image in the present invention.

A plurality of models in the present invention may be prepared for respective properties of the predetermined structure. In this case, the steps (or means) may be added to the present invention for obtaining at least one property of the structure in the input image and for selecting one of the models according to the the at least one obtained property. The weighting parameter can be obtained by fitting the selected model to the structure in the input image.

The properties refer to gender, age, and race in the case where the predetermined structure is human face. The property may be information for identifying an individual. In this case, the models for the respective properties refer to models for respective individuals.

As a specific method of obtaining the property may be listed image recognition processing having been known (such as image recognition processing described in Japanese Unexamined Patent Publication No. 11 (1999)-175724). Alternatively, the property may be inferred or obtained based on information such as GPS information accompanying the input image.

Fitting the model representing the structure to the structure in the input image refers to calculation or the like for representing the structure in the input image by the model. More specifically, in the case where the method of AAM described above is used, fitting the model refers to finding values of the weighting parameters for the respective principal components in the mathematical model.

As a specific method of adjusting sharpness in at least a part of the input image according to the value of the weighting parameter obtained for the statistical characteristic quantity representing the degree of sharpness, sharpness in a region of the predetermined structure may be adjusted by changing the value of the weighting parameter for the characteristic quantity representing the degree of sharpness, for example. Alternatively, the sharpness may be adjusted at processing strength based on the degree of sharpness of the structure corresponding to the value of the weighting parameter for the statistical characteristic quantity representing the degree of sharpness. In the latter case, the sharpness adjustment processing itself may adopt a known method such as the method described in U.S. Pat. No. 5,739,922, and a relationship is experimentally and statistically found in advance between the value of the weighting parameter for the statistical characteristic quantity representing the degree of sharpness and the processing strength of the sharpness adjustment.

In the former method wherein the value of the weighting parameter is changed, sharpness is adjusted only in the region of the predetermined structure. In the latter method based on a known method, sharpness can also be adjusted in the entire input image or in any region therein. The region of the predetermined structure and the remaining part in the input image may be subjected to the same sharpness adjustment processing (the latter method). Alternatively, sharpness may be adjusted by adopting separate methods, such as the former method for the predetermined structure and the latter method for the remaining part.

The sharpness adjustment processing may be carried out not only on the region of the predetermined structure in the input image but also on a region of the same subject neighboring the predetermined structure (assuming that the predetermined structure is a part of the subject). In the case where the structure is a human face, the region of the same subject neighboring the structure refers to a region of the neck.

In the case where the sharpness adjustment processing is carried out on a part of the input image, the sharpness adjustment processing may be carried out in such a manner that the degree (strength) of processing becomes progressively smaller toward a region where the sharpness adjustment processing is not carried out.

Furthermore, at least either sharpness enhancement processing on the region of the predetermined structure or sharpness reduction processing on the remaining region may be carried out as the sharpness adjustment processing.

According to the image processing method, the image processing apparatus, and the computer-readable recording medium storing the image processing program of the present invention, the weighting parameter for the statistical characteristic quantity representing the degree of sharpness in the structure in the input image can be obtained by fitting to the structure in the input image the model representing the predetermined structure by use of the statistical characteristic quantity or quantities including the statistical characteristic quantity representing degree of sharpness and the weighting parameter or parameters therefor. Based on the value of the obtained weighting parameter, sharpness can be adjusted in at least a part in the input image. Therefore, the sharpness adjustment processing, which is more appropriate, can be realized based on the degree of sharpness in the structure in the input image, and the image can be obtained in a more preferable state. Especially, in the case where a structure such as human face having a high probability of being a main subject is represented by the model, the more preferable image can be obtained to have sharpness adjusted appropriately for the main subject.

From another point of view, the present invention pays attention to the characteristic quantity representing the degree of sharpness, and sharpness is adjusted at the degree (processing strength) appropriate for the value of the weighting parameter for the statistical characteristic quantity corresponding to the structure in the input image. Therefore, the sharpness adjustment processing can be carried out, reflecting the degree of sharpness with high accuracy and without an effect of a factor other than the degree of sharpness such as contrast by shadow and an abrupt signal change. In this manner, the image can be obtained in a more preferable state.

In the case where the sharpness adjustment processing is carried out on the region of the structure in the input image by changing the value of the weighting parameter for the characteristic quantity representing the degree of sharpness, separate execution of sharpness adjustment processing such as the processing described in U.S. Pat. No. 5,739,922 is not necessary, which leads to a simpler configuration and improvement in processing efficiency.

In the case where the sharpness adjustment processing is carried out as has been described in U.S. Pat. No. 5,739,922 at the processing strength based on the degree of sharpness of the structure corresponding to the value of the weighting parameter for the statistical characteristic quantity representing the degree of sharpness, the sharpness adjustment processing targets not only the predetermined structure but also any region in the input image. Therefore, the processing can be realized with more flexibility.

In the case where the sharpness adjustment processing is also carried out on the region of the subject neighboring the structure (such as face), disconformity caused by difference in sharpness can be removed between the structure and the neighboring region, and the image is obtained in a more preferable state.

In the case where the sharpness adjustment processing is carried out on a part in the input image, if the sharpness adjustment processing is carried out in such a manner that the degree (strength) of the adjustment processing becomes progressively smaller toward a region where the processing is not carried out, disconformity caused by difference in sharpness can be removed between the region subjected to the processing and the region not subjected to the processing. In this manner, the image is obtained in a more preferable state.

If at least either the sharpness enhancement processing on the region of the predetermined structure such as face or the sharpness reduction processing on the background other than the structure is carried out as the sharpness adjustment processing, the image can be obtained in an extremely preferable state as a portrait with the structure as the main subject in the blurry background.

In the case where the step (or the means) for detecting the structure in the input image is added, automatic detection of the structure can be carried out, which improves operability.

In the case where the plurality of models are prepared for the respective properties of the predetermined structure in the present invention while the steps (or the means) are added for obtaining the property of the structure in the input image and for selecting one of the models in accordance with the at least one obtained property, if the weighting parameter is obtained by fitting the selected model to the structure in the input image, the structure in the input image can be fit by the model that is more suitable. Therefore, processing accuracy is improved, and the image can be obtained in higher quality.

BRIEF DESCRIPTION OF THE DRAWINGS

FIG. 8 shows luminance in mean face shapes converted from face shapes in sample images;

FIG. 9 shows how luminance of a face changes with change in values of weight coefficients for eigenvectors of principal components obtained by principal component analysis on pixel values in the face;

DESCRIPTION OF THE PREFERRED EMBODIMENTS

Hereinafter, embodiments of the present invention are described by reference to the accompanying drawings.

Figure 1:
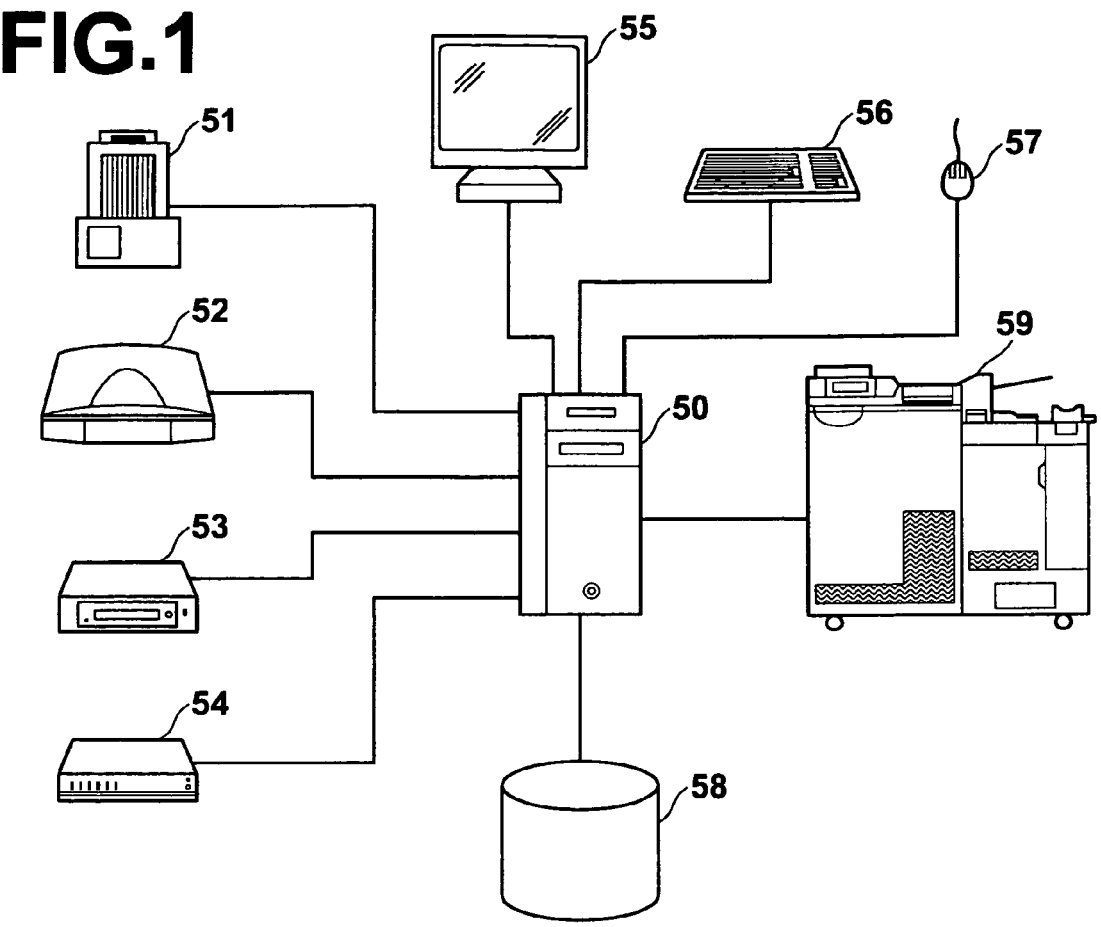
FIG. 1 shows hardware configuration of a digital photograph printer in an embodiment of the present invention.

FIG. 1 shows the hardware configuration of a digital photograph printer in an embodiment of the present invention. As shown in FIG. 1, the digital photograph printer comprises a film scanner 51, a flat head scanner 52, a media drive 53, a network adapter 54, a display 55, a keyboard 56, a mouse 57, a hard disc 58, and a photographic print output machine 59, all of which are connected to an arithmetic and control unit 50.

In cooperation with a CPU, a main storage, and various input/output interfaces, the arithmetic and control unit 50 controls a processing flow regarding an image, such as input, correction, manipulation, and output thereof, by executing a program installed from a recording medium such as a CD-ROM. In addition, the arithmetic and control unit 50 carries out image processing calculation for image correction and manipulation. Sharpness adjustment processing of the present invention is also carried out by the arithmetic and control unit 50.

The film scanner 51 photoelectrically reads an APS negative film or a 135-mm negative film developed by a film developer (not shown) for obtaining digital image data P0 representing a photograph image recorded on the negative film.

The flat head scanner 52 photoelectrically reads a photograph image represented in the form of hard copy such as an L-size print, for obtaining digital image data P0.

The media drive 53 obtains digital image data P0 representing a photograph image recorded in a recording medium such as a memory card, a CD, or a DVD. The media drive 53 can also write image data P2 to be output therein. The memory card stores image data representing an image photographed by a digital camera, for example. The CD or the DVD stores data of an image read by the film scanner regarding a previous print order, for example.

The network adapter 54 obtains image data P0 from an order reception machine (not shown) in a network photograph service system having been known. The image data P0 are image data used for a photograph print order placed by a user, and sent from a personal computer of the user via the Internet or via a photograph order reception machine installed in a photo laboratory.

The display 55 displays an operation screen for input, correction, manipulation, and output of an image carried out by the digital photograph printer. A menu for selecting the content of operation and an image to be processed are also displayed thereon, for example. The keyboard 56 and the mouse 57 are used for inputting a processing instruction.

The hard disc 58 stores a program for controlling the digital photograph printer. In the hard disc 58 are also stored temporarily the image data P0 obtained by the film scanner 51, the flat head scanner 52, the media drive 53, and the network adapter 54, in addition to image data P1 having been subjected to image correction (hereinafter referred to as the corrected image data P1) and the image data P2 having been subjected to image manipulation (the image data to be output).

The photographic print output machine 59 carries out laser scanning exposure of photographic printing paper, image development thereon, and drying thereof, based on the image data P2 representing the image to be output. The photographic print output machine 59 also prints printing information on the backside of the paper, cuts the paper for each print, and sorts the paper for each order. The manner of printing may be a laser exposure thermal development dye transfer process or the like.

Figure 2:
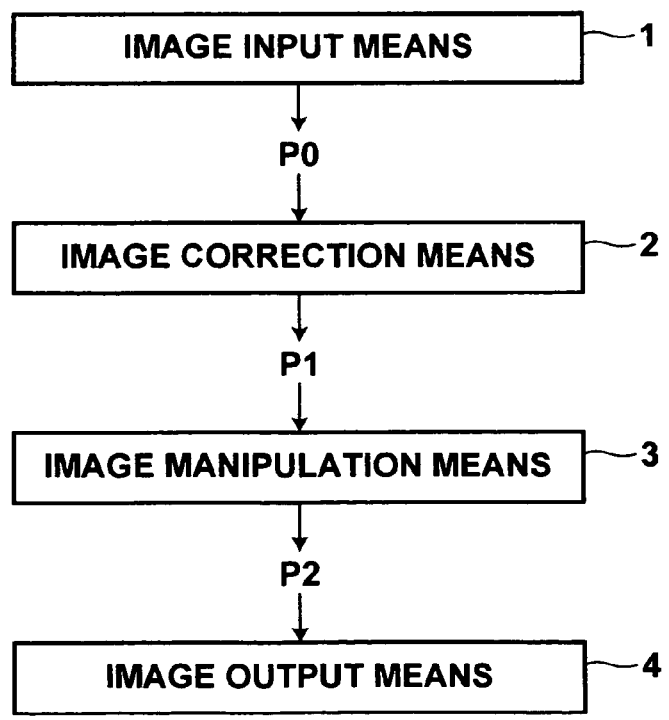
FIG. 2 is a block diagram showing functions and a flow of processing in the digital photograph printer in the embodiment and in a digital camera in another embodiment of the present invention.

FIG. 2 is a block diagram showing functions of the digital photograph printer and the flow of processing carried out therein. As shown in FIG. 2, the digital photograph printer comprises image input means 1, image correction means 2, image manipulation means 3, and image output means 4 in terms of the functions. The image input means 1 inputs the image data P0 of an image to be printed. The image correction means 2 uses the image data P0 as input, and carries out automatic image quality correction of the image represented by the image data P0 (hereinafter, image data and an image represented by the image data are represented by the same reference code) through image processing according to a predetermined image processing condition. The image manipulation means 3 uses the corrected image data P1 having been subjected to the automatic correction as input, and carries out image processing according to an instruction from an operator. The image output means 4 uses the processed image data P2 as input, and outputs a photographic print or outputs the processed image data P2 in a recording medium.

The image correction means 2 carries out processing such as contrast correction, white balance adjustment, and noise reduction and removal, in addition to the sharpness adjustment processing of the present invention. The image manipulation means 3 carries out manual correction on a result of the processing carried out by the image correction means 2. In addition, the image manipulation means 3 carries out image manipulation such as trimming, scaling, conversion to sepia image, conversion to monochrome image, and compositing with an ornamental frame.

Operation of the digital photograph printer and the flow of the processing therein are described next.

The image input means 1 firstly inputs the image data P0. In the case where an image recorded on a developed film is printed, the operator sets the film on the film scanner 51. In the case where image data stored in a recording medium such as a memory card are printed, the operator sets the recording medium in the media drive 53. A screen for selecting a source of input of the image data is displayed on the display 55, and the operator carries out the selection by using the keyboard 56 or the mouse 57. In the case where "film" has been selected as the source of input, the film scanner 51 photoelectrically reads the film set thereon, and carries out digital conversion. The image data P0 generated in this manner are then sent to the arithmetic and control unit 50. In the case where "hard copy" such as a photographic print has been selected, the flat head scanner 52 photoelectrically reads the hard copy set thereon, and carries out digital conversion. The image data P0 generated in this manner are then sent to the arithmetic and control unit 50. In the case where "recording medium" such as a memory card has been selected, the arithmetic and control unit 50 reads the image data P0 stored in the recording medium such as a memory card set in the media drive 53. In the case where an order has been placed in a network photograph service system or by a photograph order reception machine in a store, the arithmetic and control unit 50 receives the image data P0 via the network adapter 54. The image data P0 obtained in this manner are temporarily stored in the hard disc 58.

The image correction means 2 then carries out the automatic image quality correction on the image represented by the image data P0. More specifically, publicly known processing such as contrast correction, white balance adjustment, and noise reduction and removal is carried out in addition to the sharpness adjustment processing of the present invention according to an image processing program executed by the arithmetic and control unit 50, based on a setup condition set on the printer in advance. The corrected image data P1 are output to be stored in a memory of the arithmetic and control unit 50. Alternatively, the corrected image data P1 may be stored temporarily in the hard disc 58.

Figure 3A:
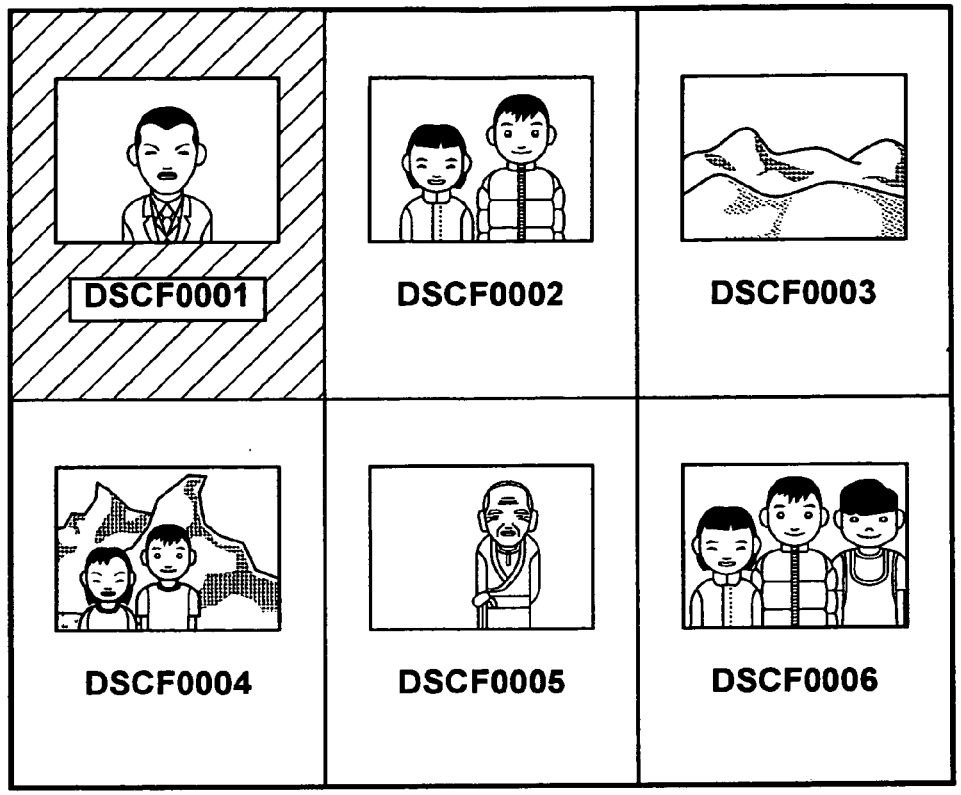
FIGS. 3A and 3B show examples of screens displayed on a display of the digital photograph printer and the digital camera in the embodiments.
Figure 3B:
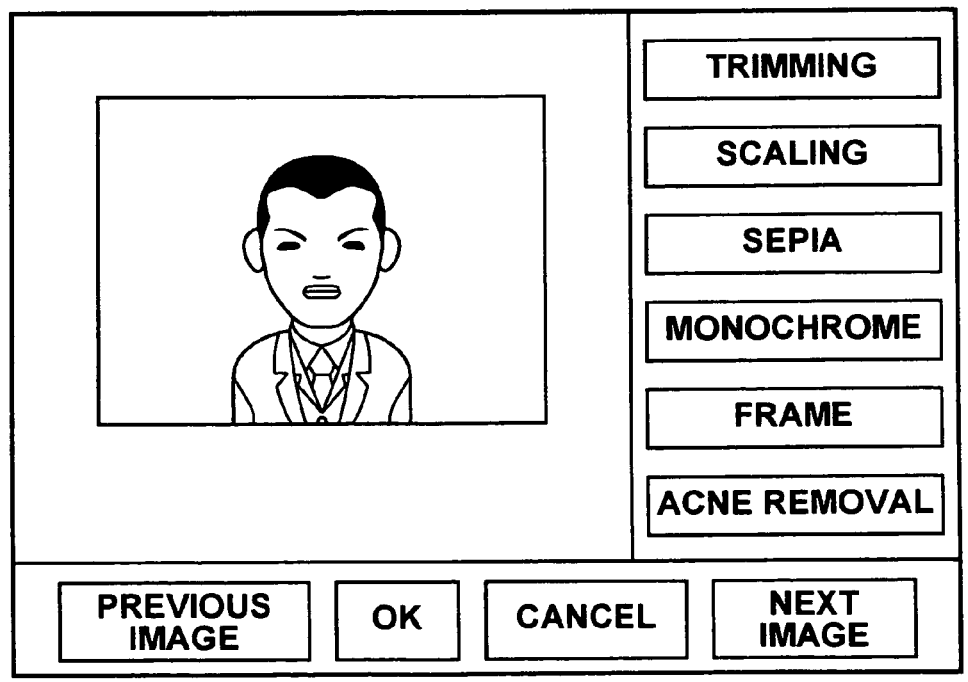

The image manipulation means 3 thereafter generates a thumbnail image of the corrected image P1, and causes the display 55 to display the thumbnail image. FIG. 3A shows an example of a screen displayed on the display 55. The operator confirms displayed thumbnail images, and selects any one of the thumbnail images that needs manual image-quality correction or order processing for image manipulation while using the keyboard 56 or the mouse 57. In FIG. 3A, the image in the upper left corner (DSCF0001) is selected. As shown in FIG. 3B as an example, the selected thumbnail image is enlarged and displayed on the display 55, and buttons are displayed for selecting the content of manual correction and manipulation on the image. The operator selects a desired one of the buttons by using the keyboard 56 or the mouse 57, and carries out detailed setting of the selected content if necessary. The image manipulation means 3 carries out the image processing according to the selected content, and outputs the processed image data P2. The image data P2 are stored in the memory of the arithmetic and control unit 50 or stored temporarily in the hard disc 58. The program executed by the arithmetic and control unit 50 controls image display on the display 55, reception of input from the keyboard 56 or the mouse 57, and image processing such as manual correction and manipulation carried out by the image manipulation means 3.

The image output means 4 finally outputs the image P2. The arithmetic and control unit 50 causes the display 55 to display a screen for image destination selection, and the operator selects a desired one of destinations by using the keyboard 56 or the mouse 57. The arithmetic and control unit 50 sends the image data P2 to the selected destination. In the case where a photographic print is generated, the image data P2 are sent to the photographic print output machine 59 by which the image data P2 are output as a photographic print. In the case where the image data P2 are recorded in a recording medium such as a CD, the image data P2 are written in the CD or the like set in the media drive 53.

Figure 4:
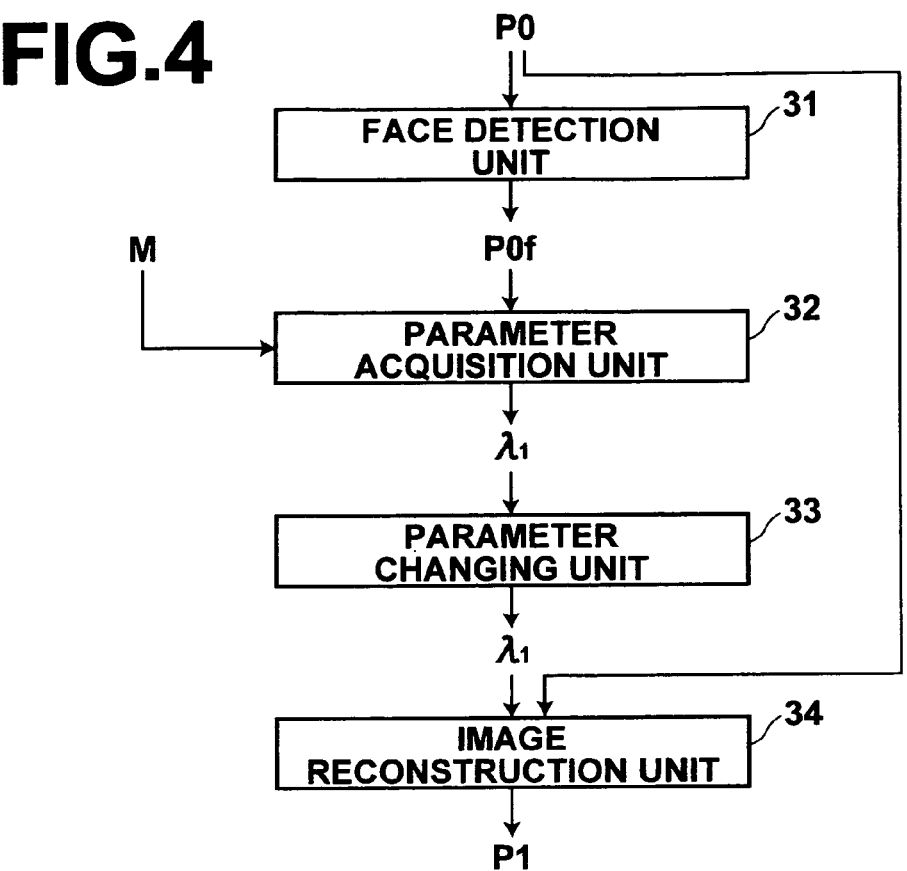
FIG. 4 is a block diagram showing details of sharpness adjustment processing in one aspect of the present invention.

The sharpness adjustment processing of the present invention carried out by the image correction means 2 is described below in detail. FIG. 4 is a block diagram showing details of the sharpness adjustment processing. As shown in FIG. 4, the sharpness adjustment processing is carried out by a face detection unit 31, a parameter acquisition unit 32, a parameter changing unit 33, and an image reconstruction unit 34. The face detection unit 31 detects a face region P0f in the image P0. The parameter acquisition unit 32 fits to the detected face region P0f a mathematical model M generated by a method of AAM (see Reference 1 above) based on a plurality of sample images representing human faces in different degrees of sharpness, and obtains a weighting parameter $\lambda_1$ for a principal component representing a degree of sharpness in the face region P0f. The parameter changing unit 33 changes a value of the weighting parameter $\lambda_1$ to a preset optimal value for face sharpness. The image reconstruction unit 34 reconstructs the image based on the weighting parameter having been changed (hereinafter referred to as the weighting parameter $\lambda_1$'), and obtains the image P1 having been subjected the sharpness adjustment processing. The processing described above is controlled by the program installed in the arithmetic and control unit 50.

Figure 5:
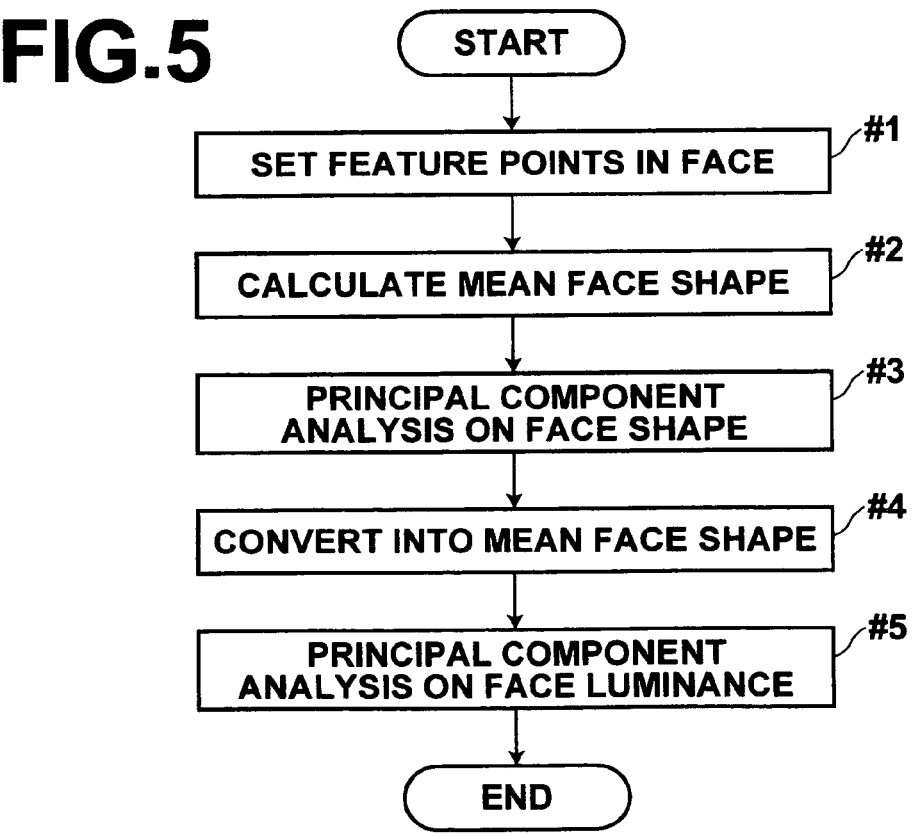
FIG. 5 is a flow chart showing a procedure for generating a mathematical model of face image in the present invention.

The mathematical model M is generated according to a flow chart shown in FIG. 5, and installed in advance together with the programs described above. Hereinafter, how the mathematical model M is generated is described.

Figure 6:
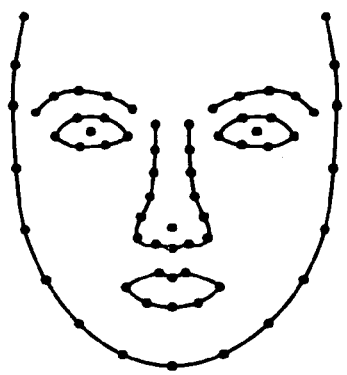
FIG. 6 shows an example of how feature points are set in a face.

For each of the sample images representing human faces in different degrees of sharpness, feature points are set therein as shown in FIG. 6 for representing face shape (Step #1). In this case, the number of the feature points is 122. However, only 60 points are shown in FIG. 6 for simplification. Which part of face is represented by which of the feature points is predetermined, such as the left corner of the left eye represented by the first feature point and the center between the eyebrows represented by the 38$^{th}$ feature point. Each of the feature points may be set manually or automatically according to recognition processing. Alternatively, the feature points may be set automatically and later corrected manually upon necessity.

Based on the feature points set in each of the sample images, mean face shape is calculated (Step #2). More specifically, mean values of coordinates of the feature points representing the same part are found among the sample images.

Principal component analysis is then carried out based on the coordinates of the mean face shape and the feature points representing the face shape in each of the sample images (Step #3). As a result, any face shape can be approximated by Equation (1) below:

$$S = S_0 + \sum_{i=1}^{n} p_i b_i \qquad (1)$$

Figure 7:
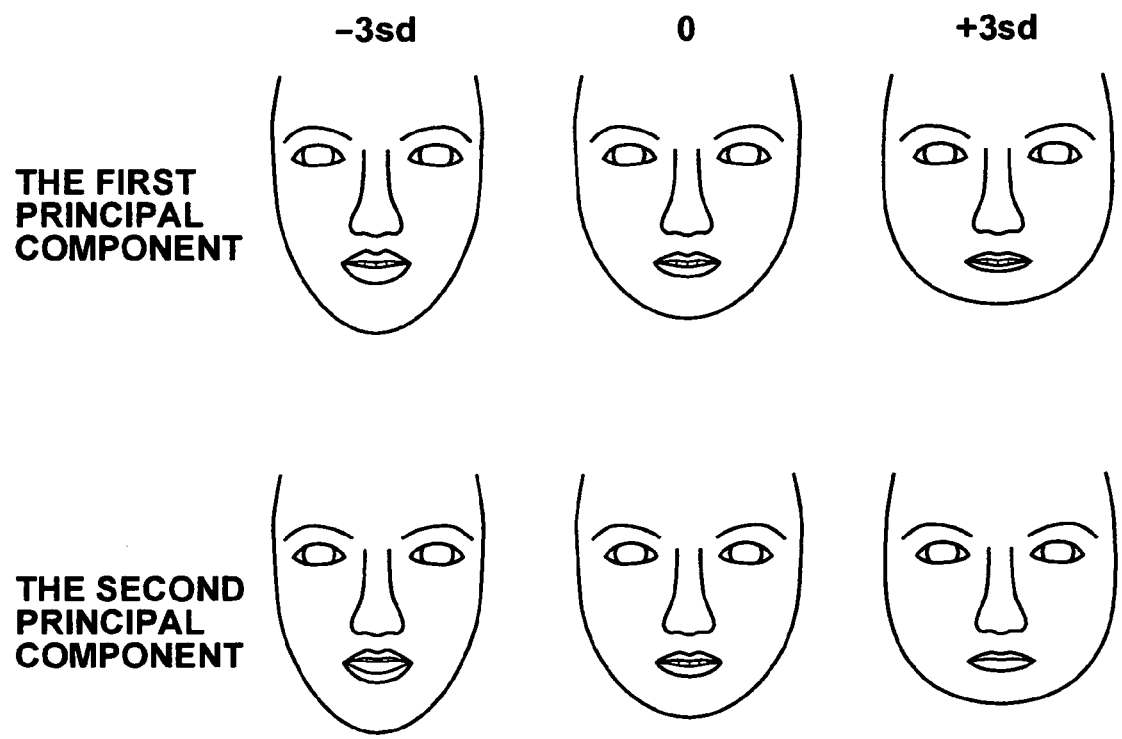
FIG. 7 shows how a face shape changes with change in values of weight coefficients for eigenvectors of principal components obtained through principal component analysis on the face shape.

S and $S_0$ are shape vectors represented respectively by simply listing the coordinates of the feature points $(x_1, y_1, \ldots, x_{122}, y_{122})$ in the face shape and in the mean face shape, while $p_i$ and $b_i$ are an eigenvector representing the i$^{th}$ principal component for the face shape obtained by the principal component analysis and a weight coefficient therefor, respectively. FIG. 7 shows how face shape changes with change in values of the weight coefficients $b_1$ and $b_2$ for the eigenvectors $p_1$ and $p_2$ as the highest and second-highest order principal components obtained by the principal component analysis. The change ranges from −3 sd to +3 sd where sd refers to standard deviation of each of the weight coefficients $b_1$ and $b_2$ in the case where the face shape in each of the sample images is represented by Equation (1). The face shape in the middle of 3 faces for each of the components represents the face shape in the case where the value of the corresponding weight coefficient is the mean value. In this example, a component contributing to face outline has been extracted as the first principal component through the principal component analysis. By changing the weight coefficient $b_1$, the face shape changes from an elongated shape (corresponding to −3 sd) to a round shape (corresponding to +3 sd). Likewise, a component contributing to how much the mouth is open and to length of chin has been extracted as the second principal component. By changing the weight coefficient $b_2$, the face changes from a state of open mouth and long chin (corresponding to −3 sd) to a state of closed mouth and short chin (corresponding to +3 sd). The smaller the value of i, the better the component explains the shape. In other words, the i$^{th}$ component contributes more to the face shape as the value of i becomes smaller.

Each of the sample images is then subjected to conversion (warping) into the mean face shape obtained at Step #2 (Step #4). More specifically, shift values are found between each of the sample images and the mean face shape, for the respective feature points. In order to warp pixels in each of the sample images to the mean face shape, shift values to the mean face shape are calculated for the respective pixels in each of the sample images according to 2-dimensional 5-degree polynomials (2) to (5) using the shift values having been found:

$$x' = x + \Delta x \qquad (2)$$

$$y' = y + \Delta y \qquad (3)$$

$$\Delta x = \sum_{i=0}^{n} \sum_{j=0}^{n-i} a_{ij} \cdot x^i \cdot y^j \qquad (4)$$

$$\Delta x = \sum_{i=0}^{n} \sum_{j=0}^{n-i} a_{ij} \cdot x^i \cdot y^j \qquad (5)$$

In Equations (2) to (5) above, x and y denote the coordinates of each of the feature points in each of the sample images while x' and y' are coordinates in the mean face shape to which x and y are warped. The shift values to the mean shape are represented by $\Delta x$ and $\Delta y$ with n being the number of dimensions while $a_{ij}$ and $b_{ij}$ are coefficients. The coefficients for polynomial approximation can be found by using a least square method. In the case that the coordinates of a feature point become non-integer values (that is, values including decimals), pixel values of four pixels (having integer coordinates) that surround the coordinates after warping are found through linear approximation of the pixel values. More specifically, for 4 pixels surrounding the coordinates of the non-integer values generated by warping, the pixel values for each of the 4 pixels are determined in proportion to a distance thereto from the coordinates generated by warping. FIG. 8 shows how the face shape of each of 3 sample images is changed to the mean face shape.

Thereafter, principal component analysis is carried out, using luminance of each of the pixels as variables in each of the sample images after the change to the mean face shape (Step #5). As a result, the luminance in the mean face shape converted from any arbitrary face image can be approximated by Equation (6) below:

$$A = A_0 + \sum_{i=1}^{m} q_i \lambda_i \quad (6)$$

In Equation (6), A denotes a luminance vector $(a_1, \ldots, a_m)$ represented by listing the luminance at each of the pixels in the mean face shape (where a represents the luminance while 1 to m refer to subscripts for identifying the respective pixels with m being the total number of pixels in the mean face shape). $A_0$ is a mean face luminance vector represented by listing mean values of the luminance at each of the pixels in the mean face shape while $q_i$ and $\lambda_i$ refer to an eigenvector representing the $i^{th}$ principal component for the luminance in the face obtained by the principal component analysis and a weight coefficient therefor, respectively. The smaller the value of i is, the better the component explains the luminance. In other words, the component contributes more to the luminance as the value of i becomes smaller.

FIG. 9 shows how the luminance of faces change with change in values of the weight coefficients $\lambda_{i1}$ and $\lambda_{i2}$ for the eigenvectors $q_{i1}$ and $q_{i2}$ representing the $i_1^{th}$ and $i_2^{th}$ principal components obtained through the principal component analysis. The change in the weight coefficients ranges from −3 sd to +3 sd where sd refers to standard deviation of each of the values of the weight coefficients $\lambda_{i1}$ and $\lambda_{i2}$ in the case where the luminance in each of the face sample images are represented by Equation (6) above. For each of the principal components, the face in the middle of the 3 images corresponds to the case where the corresponding weight coefficient $\lambda_{i1}$ or $\lambda_{i2}$ is the mean value. In the examples shown in FIG. 9, a component contributing to presence or absence of beard has been extracted as the $i_1^{th}$ principal component through the principal component analysis. By changing the weight coefficient $\lambda_{i1}$, the face changes from the face with dense beard (corresponding to −3 sd) to the face with no beard (corresponding to +3 sd). Likewise, a component contributing to sharpness has been extracted as the $i_2^{th}$ principal component through the principal component analysis. By changing the weight coefficient $\lambda_{i2}$, the face changes from the face with an emphasized outline (corresponding to −3 sd) to the face with a blurry outline (corresponding to +3 sd). How each of the principal components contributes to what factor is determined through interpretation. The principal component contributing to sharpness is not necessarily extracted as the first principal component. In the case where the component contributing to sharpness is extracted as the $K^{th}$ principal component (K≠1), the first principal component in the description below can be replaced with the $K^{th}$ principal component. The degree of sharpness is not necessarily represented by a single principal component, and a plurality of principal components may contribute to the degree of sharpness.

Through the processing from Step #1 to #5 described above, the mathematical model M is generated. In other words, the mathematical model M is represented by the eigenvectors pi representing the face shape and the eigenvectors $q_i$ representing the face luminance in the mean face shape, and the number of the eigenvectors is far smaller for $p_i$ and for $q_i$ than the number of pixels forming the face image. In other words, the mathematical model M has been compressed in terms of dimension. In the example described in Reference 1, 122 feature points are set for a face image of approximately 10,000 pixels, and a mathematical model of face image represented by 23 eigenvectors for face shape and 114 eigenvectors for face luminance has been generated through the processing described above. By changing the weight coefficients for the respective eigenvectors, 90% of variations or more in face shape and luminance can be expressed.

A flow of the sharpness adjustment processing based on the method of AAM using the mathematical model M is described below, by reference to FIG. 4.

The face detection unit 31 reads the image data P0, and detects the face region P0f in the image P0. More specifically, a first characteristic quantity representing the direction of a gradient vector showing a direction and a magnitude of an edge at each of the pixels in the image P0 is firstly input to a plurality of first detectors (which will be described later) for judgment as to whether a face candidate region exists in the image P0, as has been described in Japanese Unexamined Patent Publication No. 2005-108195 (hereinafter referred to as Reference 2). In the case where a face candidate region exists, the region is extracted, and the magnitude of the gradient vector is normalized at each of the pixels in the face candidate region. A second characteristic quantity representing the direction and the magnitude of the normalized gradient vector is then input to a plurality of second detectors (which will be described later) for judgment as to whether the extracted face candidate region is a true face region. In the case where the region is a true face region, the region is detected as the face region P0f. The first/second detectors have been obtained through training using a method of machine learning such as AdaBoost that uses as input the first/second characteristic quantity calculated for face sample images and non-face sample images.

As a method of detection of the face region P0f may be used various known methods such as a method using a correlation score between an eigen-face representation and an image as has been described in Published Japanese Translation of a PCT Application No. 2004-527863 (hereinafter referred to as Reference 3). Alternatively, the face region can be detected by using a knowledge base, characteristics extraction, skin-color detection, template matching, graph matching, and a statistical method (such as a method using a neural network, SVM, and HMM), for example. Furthermore, the face region P0f may be specified manually by use of the keyboard 56 and the mouse 57 when the image P0 is displayed on the display 55. Alternatively, a result of automatic detection of the face region may be corrected manually.

The parameter acquisition unit 32 fits the mathematical model M to the face region P0f. More specifically, the parameter acquisition unit 32 reconstructs the image according to Equations (1) and (6) described above while sequentially changing the values of the weight coefficients $b_i$ and $\lambda_i$ for the eigenvectors $p_i$ and $q_i$ corresponding to the principal components in order of higher order in Equations (1) and (6). The parameter acquisition unit 32 then finds the values of the weight coefficients $b_i$ and $\lambda_i$ causing a difference between the reconstructed image and the face region P0f to become minimal (see Reference 3 for details). The weight coefficient $\lambda_i$ is the parameter representing the degree of sharpness. It is preferable for the values of the weight coefficients $b_i$ and $\lambda_i$ to range only from −3 sd to +3 sd, for example, where sd refers to the standard deviation in each of distributions of $b_i$ and $\lambda_i$ when the sample images used at the time of generation of the model are represented by Equations (1) and (6). In the case where the values do not fall within the range, it is preferable for the weight coefficients to take the mean values in the distributions. In this manner, erroneous application of the model can be avoided.

The parameter changing unit 33 changes the value of the parameter $\lambda_1$ to the preset optimal value for face sharpness. The optimal value is defined in a setting file accessed by the program that causes the sharpness adjustment processing to be carried out, and the setting file is installed in the arithmetic and control unit 50 together with the program. A face image does not necessarily appear to be more preferable as an outline thereof becomes sharper. Therefore, the value is initially set to a value corresponding to sharpness that is experientially and statistically thought to be preferable. Furthermore, the operator can appropriately change the value.

The image reconstruction unit 34 generates an image P1f by reconstructing the image of the face region according to Equation (1) and (6) based on the parameter $\lambda_1$' and the other parameters $b_i$ and $\lambda_i$. The image reconstruction unit 34 then generates the image P1 by replacing the face region P0f in the original input image P0 with the image P1f.

As has been described above, according to the sharpness adjustment processing in the embodiment of the present invention, the parameter acquisition unit 32 obtains the weight coefficient $\lambda_1$ corresponding to the principal component representing the degree of sharpness in the face region P0f detected by the face detection unit 31 in the image P0, by fitting to the face region P0f the mathematical model M generated according to the method of AAM using the sample images representing human faces in different degrees of sharpness. The parameter changing unit 33 changes the value of the parameter $\lambda_1$ to the preset optimal face sharpness value, and the image reconstruction unit 34 reconstructs the image based on the parameter $\lambda_1$' for outputting the image P1 having been subjected to the sharpness adjustment. Therefore, the image can be obtained in a more preferable state where the face region having a high probability of being a main subject of the image has been adjusted to have more appropriate sharpness. Furthermore, the mathematical model of face region based on the method of AAM has been adopted, and sharpness is adjusted by changing the weighting parameter for the principal component representing the degree of sharpness. Therefore, the sharpness adjustment processing can be carried out, reflecting the degree of sharpness with high accuracy and without an effect of other factors such as contrast by shadow and abrupt signal change. In this manner, the more preferable image can be obtained. In addition, separate sharpness adjustment processing as has been described in U.S. Pat. No. 5,739,922 is not necessary, which leads to the simpler configuration and improvement in processing efficiency.

Modifications to the sharpness adjustment processing in the embodiment described above are described next.

Figure 10:
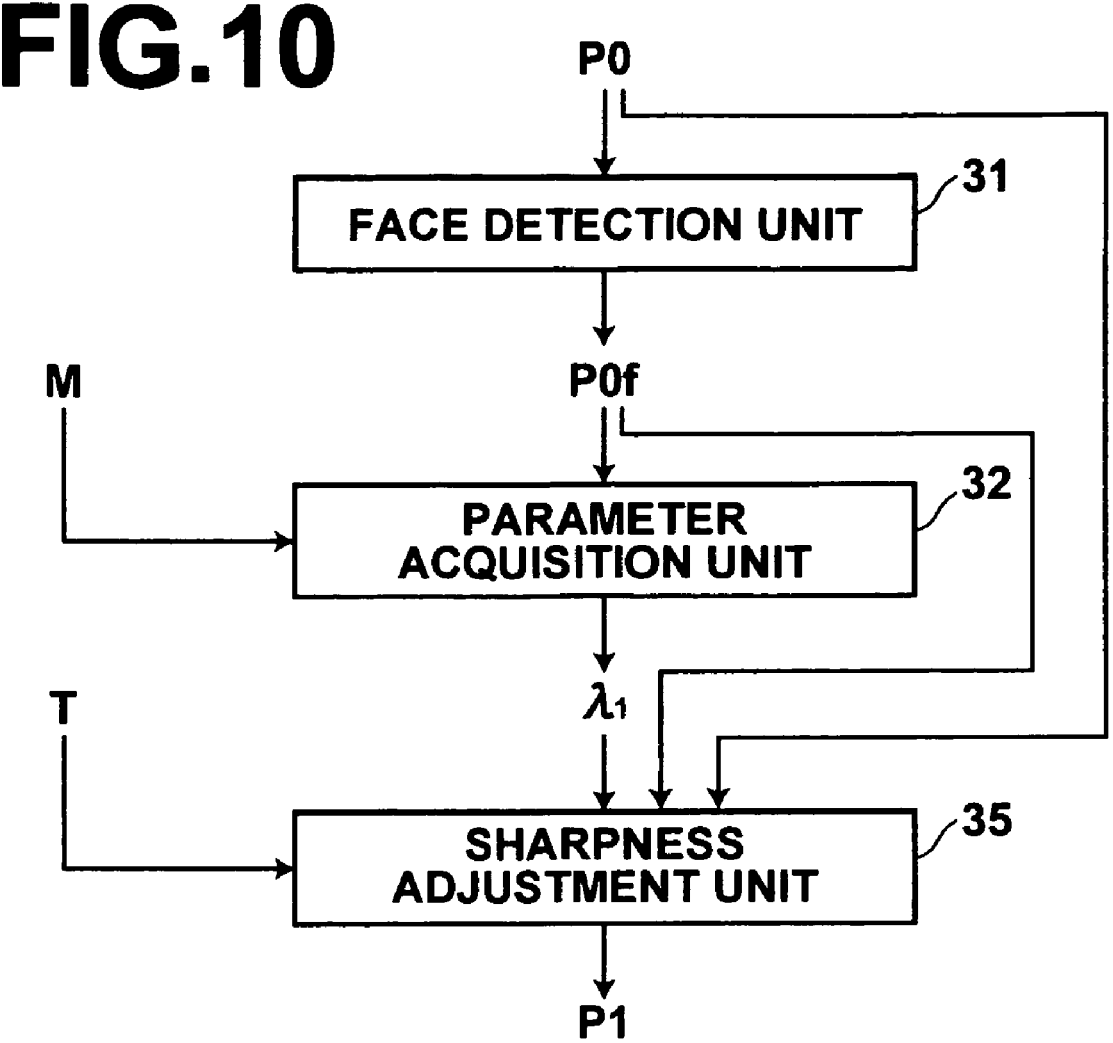
FIG. 10 is a block diagram showing a first modification to the sharpness adjustment processing in the present invention.

FIG. 10 is a block diagram showing in detail a first modification to the sharpness adjustment processing. As shown in FIG. 10, the parameter changing unit 33 and the image reconstruction unit 34 in the above embodiment are replaced with a sharpness adjustment unit 35.

The sharpness adjustment unit 35 refers to a reference table T based on the parameter $\lambda_1$ obtained by the parameter acquisition unit 32, and obtains processing strength a for the sharpness adjustment processing. The reference table T defines a relationship found experimentally and statistically in advance between the parameter $\lambda_1$ and the strength $\alpha$. The strength $\alpha$ will be described later. Alternatively, a function using the parameter $\lambda_1$ as input and outputting the strength $\alpha$ may be defined without using the reference table T, for finding the strength $\alpha$ based on the function.

The sharpness adjustment unit 35 carries out sharpness adjustment processing according to Equation (7) below on the face region P0f, and outputs the face region P1f having been subjected to the sharpness adjustment processing:

$$S' = S_{org} + \alpha(S_{org} - S_{us}) \qquad (7)$$

where S' and $S_{org}$ respectively represent the output image data and the input image data (P0f) while $S_{us}$ denotes an unsharp mask generated by unsharping the data $S_{org}$. Various known methods can be used for the sharpness adjustment processing. For example, as has been described in U.S. Pat. No. 5,739,922, the image data P0f may be decomposed into low frequency components $R_L$, $G_L$, and $B_L$ and into medium-high frequency components $R_{MH}$, $G_{MG}$, and $B_{MH}$. The frequency components are further converted into the basic YIQ color space, and a luminance component $Y_{MH}$ is obtained by setting the I component and the Q component to 0. The luminance component $Y_{MH}$ is decomposed into a medium frequency component $Y_M$ and a high frequency component $Y_H$. Thereafter, a gain M of the medium frequency component $Y_M$ is set higher than a gain H of the high frequency component $Y_H$, and a luminance component $Y_{MH}$' is obtained by combining components $Y_M$' and $Y_H$' obtained by multiplying the components $Y_M$ and $Y_H$ by the corresponding gains M and H. The luminance component $Y_{MH}$' is combined with the low frequency components $R_L$, $G_L$, and $B_L$, and image signals R', G' and B' having been subjected to the sharpness adjustment processing are obtained. In this case, the gains M and H are equivalent to the processing strength described above.

The sharpness adjustment unit 35 generates the image P1 by replacing the face region P0f in the original image P0 with the face region P1f having been subjected to the sharpness adjustment processing.

In this manner, the same effect as in the embodiment described above can be obtained. However, the configuration becomes more complex due to installation of the known sharpness adjustment processing.

On the other hand, in the embodiment described above, the sharpness adjustment is realized by changing the value of the weighting parameter $\lambda_1$ in the mathematical model M. Therefore, a range of sharpness adjustment is limited to the face region represented by the model M. However, in the first modification, the known sharpness adjustment is adopted. Therefore, the sharpness adjustment processing can be carried out on any region in the input image P0.

For example, a skin-color region (such as the neck) around the face region P0f may be detected through a known method (such as a method described in Japanese Unexamined Patent Publication No. 2002-152772) so that the same sharpness adjustment processing can also be carried out on the detected skin-color region.

Furthermore, the sharpness adjustment processing may be carried out on the entire image P0 to generate the image P1.

In the case where the sharpness adjustment processing is carried out only on a region in the image P0, the processing strength $\alpha$ may be changed in such a manner that sharpness is adjusted progressively less toward a region where the sharpness adjustment processing is not carried out.

The processing strength of the sharpness adjustment may be changed between the face region P0f and the remaining background region. More specifically, the sharpness enhancement processing is carried out at processing strength $\alpha_1$ in the face region P0f for a clearer outline thereof, while sharpness reduction processing is carried out at processing strength $\alpha_2$ in the background region for a blurry outline thereof. Alternatively, only either the sharpness enhancement processing or the sharpness reduction processing may be carried out. In this manner, the image can be obtained as a preferable portrait wherein the outline of face is sharp while the background is blurry. Furthermore, since the face region P0f is detected by using the mathematical model M of face image in the present invention, the detection accuracy is high and the more preferable portrait image can be obtained.

Figure 11:
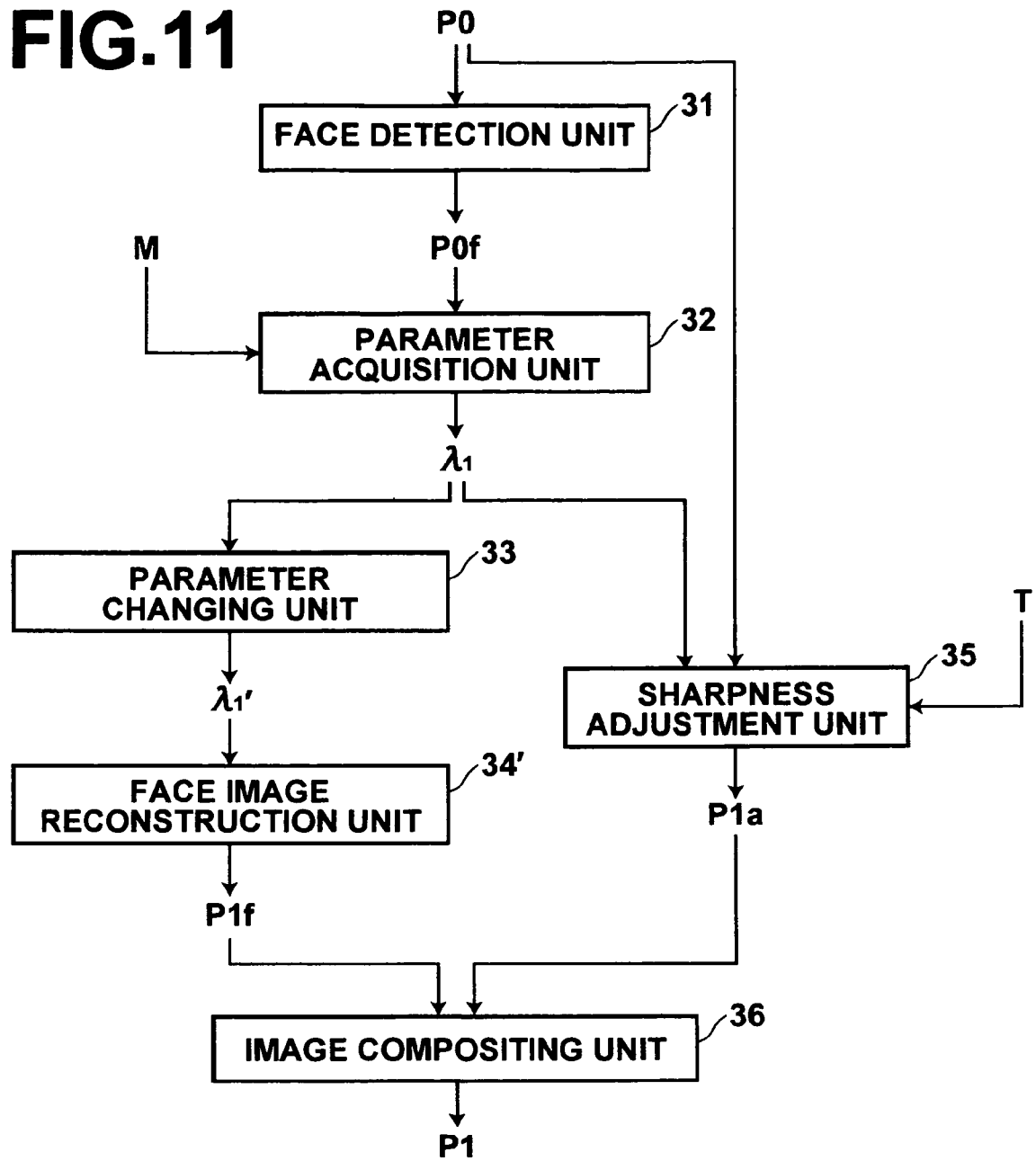
FIG. 11 is a block diagram showing a second modification to the sharpness adjustment processing in the present invention.

In this case, the sharpness enhancement processing may be carried out on the face region P0f by adjusting the value of the weighting parameter $\lambda_1$ corresponding to the degree of sharpness while the sharpness reduction processing is carried out according to a known method on the background region at processing strength $\alpha_3$ that is obtained based on the value of the parameter $\lambda_1$. FIG. 11 is a block diagram showing the sharpness adjustment processing in this case as a second modification to the embodiment. As shown in FIG. 11, the configuration wherein the image reconstruction unit 34 in the embodiment shown in FIG. 4 is replaced with a face image reconstruction unit 34' is combined with the first modification (see FIG. 10), in addition to an image compositing unit 36. In the second modification, the face image reconstruction unit 34' reconstructs only the image of the face region for generating the face region P1f having been subjected to the sharpness enhancement processing by the parameter value change while the sharpness adjustment unit 35 generates an image P1a by carrying out the sharpness reduction processing at the processing strength $\alpha_3$ on the entire image P0. The image compositing unit 36 then generates the image P1 having been subjected to the image processing for portrait image by replacing the face region in the image P1a generated by the sharpness adjustment unit 35 with the face region P1f generated by the face image reconstruction unit 34'.

For determining which of the types of the sharpness adjustment processing described above is carried out on what type of image, application conditions may be defined separately and related to the corresponding types of the sharpness adjustment processing. For example, information on photography mode recorded in an Exif tag as meta-data of the image data P0 may be judged. In the case where the photography mode is "portrait" mode, the image processing for portrait is carried out. The value of the parameter after the change described in the setting file accessed by the parameter changing unit 33 and the value of the processing strength defined in the reference table T accessed by the sharpness adjustment unit 35 are defined for the respective application conditions.

In the above description, the only principal component is assumed to represent sharpness. However, in the case where a plurality of principal components represent sharpness, values of the weight coefficients (such as $\lambda_1, \lambda_2, \lambda_3, \ldots, \lambda_J$) for the principal components are changed in the sharpness adjustment carried out by the parameter changing unit 33. In the sharpness adjustment carried out by the sharpness adjustment unit 35, the processing strength $\alpha$ is determined based on a combination of the values of the weight coefficients for the principal components. More specifically, the processing strength $\alpha$ may be defined in the reference table T for each combination of the values of the weight coefficients. Alternatively, a new parameter C can be found as a linear combination of the weight coefficients as shown by Equation (8) below so that the processing strength $\alpha$ may be defined for each value of the parameter C (where $\alpha_i$ refers to a coefficient representing a rate of contribution of the principal component corresponding to the weight coefficient $\lambda_i$ to the degree of sharpness):

$$C = \sum_{i=1}^{J} \alpha_i \lambda_i \qquad (8)$$

A higher-dimension reference table relating the combination of the values of the weight coefficients with the value of the parameter C may also be used for finding the processing strength. Furthermore, a function using the weight coefficients $\lambda_1, \lambda_2, \lambda_3, \ldots, \lambda_J$ as input and outputting the processing strength $\alpha$ may be defined.

Figure 12:
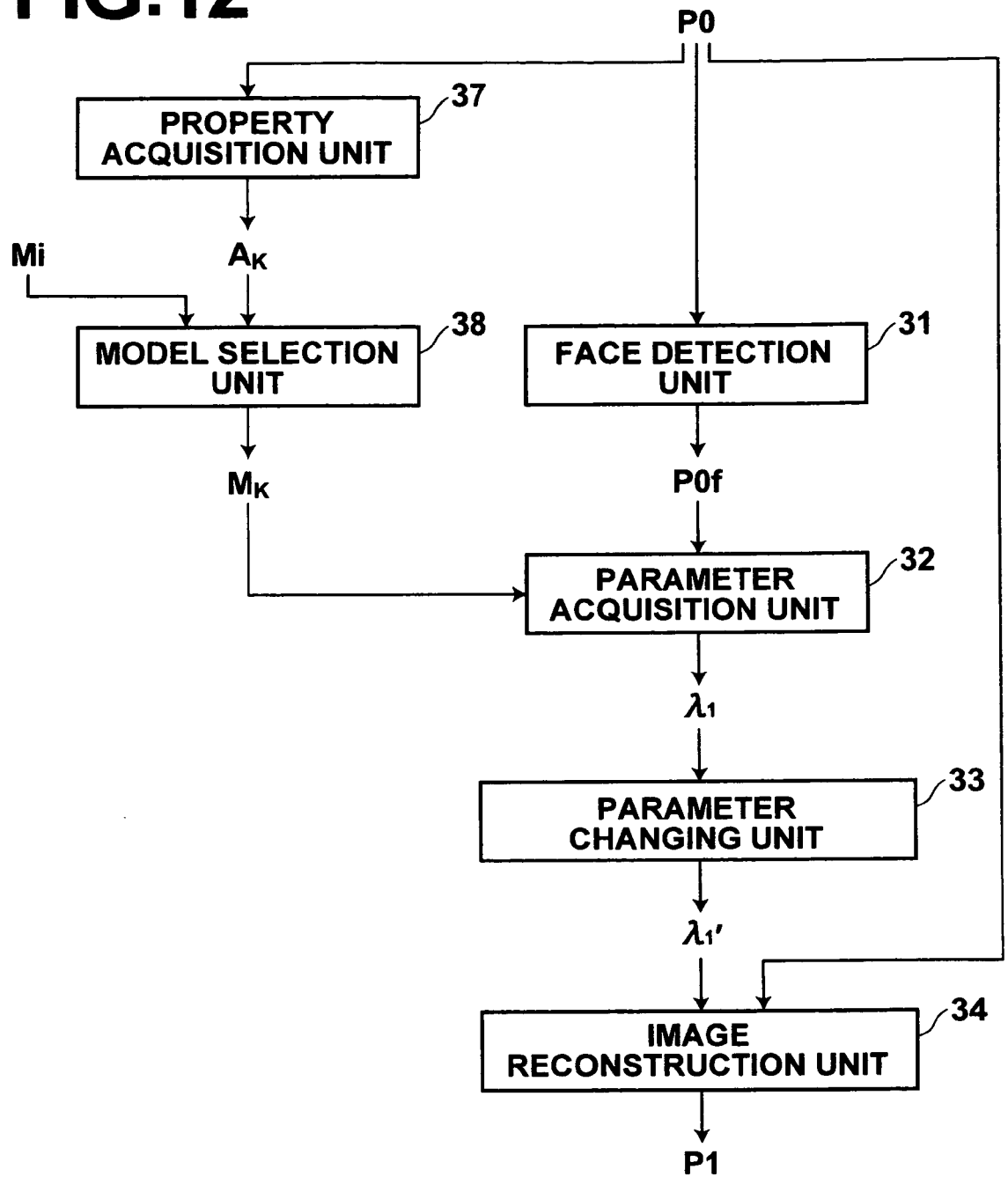
FIG. 12 is a block diagram showing an advanced aspect of the sharpness adjustment processing in the present invention.

In the embodiment described above, the mathematical model M is unique. However, a plurality of mathematical models Mi (i=1, 2, . . . ) may be generated for respective properties such as race, age, and gender, for example. FIG. 12 is a block diagram showing details of the sharpness adjustment processing in this case. As shown in FIG. 12, a property acquisition unit 37 and a model selection unit 38 are added, which is different from the embodiment shown in FIG. 4. The property acquisition unit 37 obtains property information $A_K$ of a subject in the image P0. The model selection unit 38 selects a mathematical model $M_K$ generated only from sample images representing subjects having a property represented by the property information $A_K$.

The mathematical models Mi have been generated based on the method described above (see FIG. 5), only from sample images representing subjects of the same race, age, and gender, for example. The mathematical models $M_i$ are stored by being related to property information $A_i$ representing each of the properties that is common among the samples used for the model generation.

The property acquisition unit 34 may obtain the property information $A_K$ by judging the property of the subject through execution of known recognition processing (such as processing described in Japanese Unexamined Patent Publication No. 11(1999)-175724) on the image P0. Alternatively, the property of the subject may be recorded at the time of photography as accompanying information of the image P0 in a header or the like so that the recorded information can be obtained. The property of the subject may be inferred from accompanying information. In the case where GPS information representing a photography location is available, the country or a region corresponding to the GPS information can be identified, for example. Therefore, the race of the subject can be inferred to some degree. By paying attention to this fact, a reference table relating GPS information to information on race may be generated in advance. By inputting the image P0 obtained by a digital camera that obtains the GPS information at the time of photography and records the GPS information in a header of the image P0 (such as a digital camera described in Japanese Unexamined Patent Publication No. 2004-153428), the GPS information recorded in the header of the image data P0 is obtained. The information on race related to the GPS information may be inferred as the race of the subject when the reference table is referred to according to the GPS information.

The model selection unit 35 obtains the mathematical model $M_K$ related to the property information $A_K$ obtained by the property acquisition unit 34, and the parameter acquisition unit 32 fits the mathematical model $M_K$ to the face region P0f in the image P0.

As has been described above, in the case where the mathematical models $M_i$ corresponding to the properties have been prepared, if the model selection unit 35 selects the mathematical model $M_K$ related to the property information $A_K$ obtained by the property acquisition unit 34 and if the parameter acquisition unit 32 fits the selected mathematical model $M_K$ to the face region P0f, the mathematical model $M_K$ does not have eigenvectors contributing to variations in face shape and luminance caused by difference in the property represented by the property information $A_K$. Therefore, the face region P0f can be represented only by eigenvectors representing factors determining the face shape and luminance other than the factor representing the property. Consequently, processing accuracy improves, and the image can be obtained in higher quality.

From a viewpoint of improvement in processing accuracy, it is preferable for the mathematical models for respective properties to be specified further so that a mathematical model for each individual as a subject can be generated. In this case, the image P0 needs to be related to information identifying each individual.

In the embodiment described above, the mathematical models are installed in the digital photograph printer in advance. However, from a viewpoint of processing accuracy improvement, it is preferable for mathematical models for different human races to be prepared so that which of the mathematical models is to be installed can be changed according to a country or a region to which the digital photograph printer is going to be shipped.

The function for generating the mathematical model may be installed in the digital photograph printer. More specifically, a program for causing the arithmetic and control unit 50 to execute the processing described by the flow chart in FIG. 5 is installed therein. In addition, a default mathematical model maybe installed at the time of shipment thereof. In this case, the mathematical model may be customized based on images input to the digital photograph printer. Alternatively, a new model different from the default model may be generated. This is especially effective in the case where the mathematical models for respective individuals are generated.

In the embodiment described above, the individual face image is represented by the weight coefficients $b_i$ and $\lambda_i$ for the face shape and the luminance. However, variation in the face shape is correlated to variation in the luminance. Therefore, a new appearance parameter c can be obtained for controlling both the face shape and the luminance as shown by Equations (9) and (10) below, through further execution of principal component analysis on a vector $(b_1, b_2, \ldots, b_i, \ldots, \lambda_1, \lambda_2, \ldots, \lambda_i, \ldots)$ combining the weight coefficients $b_i$ and $\lambda_i$:

$$S = S_0 + Q_S c \quad (9)$$

$$A = A_0 + Q_A c \quad (10)$$

A difference from the mean face shape can be represented by the appearance parameter c and a vector $Q_S$, and a difference from the mean luminance can be represented by the appearance parameter c and a vector $Q_A$.

In the case where this model is used, the parameter acquisition unit 32 finds the face luminance in the mean face shape based on Equation (10) above while changing a value of the appearance parameter c. Thereafter, the face image is reconstructed by conversion from the mean face shape according to Equation (9) above, and the value of the appearance parameter c causing a difference between the reconstructed face image and the face region P0f to be minimal is found.

Figure 13:
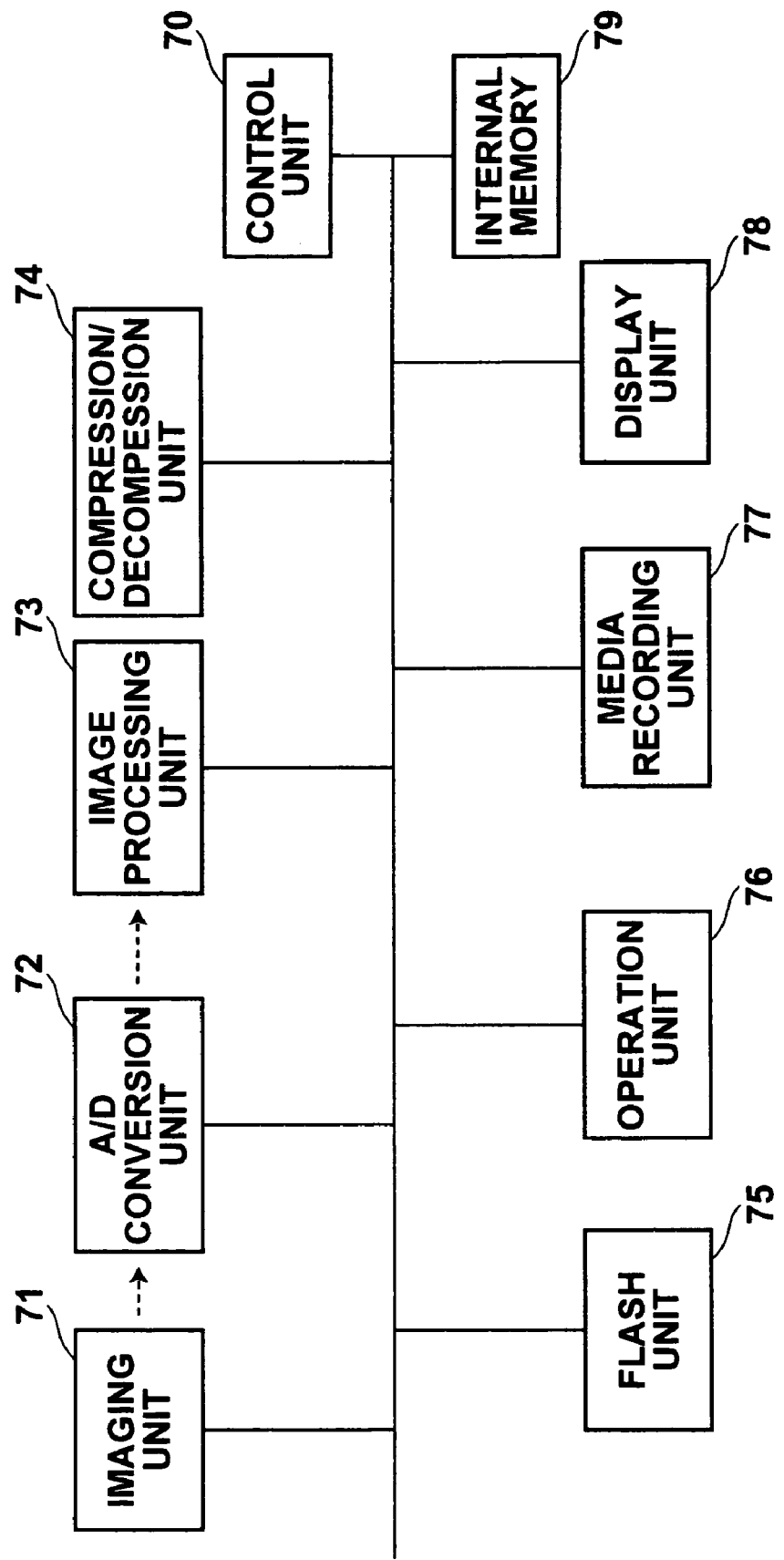
FIG. 13 shows the configuration of the digital camera in the embodiment of the present invention.

Another embodiment of the present invention can be implementation of the sharpness adjustment processing in a digital camera. FIG. 13 shows the configuration of such a digital camera. As shown in FIG. 13, the digital camera has an imaging unit 71, an A/D conversion unit 72, an image processing unit 73, a compression/decompression unit 74, a flash unit 75, an operation unit 76, a media recording unit 77, a display unit 78, a control unit 70, and an internal memory 79. The imaging unit 71 comprises a lens, an iris, a shutter, a CCD, and the like, and photographs a subject. The A/D conversion unit 72 obtains digital image data P0 by digitizing an analog signal represented by charges stored in the CCD of the imaging unit 71. The image processing unit 73 carries out various kinds of image processing on image data such as the image data P0. The compression/decompression unit 74 carries out compression processing on image data to be stored in a memory card, and carries out decompression processing on image data read from a memory card in a compressed form. The flash unit 75 comprises a flash and the like, and carries out flash emission. The operation unit 76 comprises various kinds of operation buttons, and is used for setting a photography condition, an image processing condition, and the like. The media recording unit 77 is used as an interface with a memory card in which image data are stored. The display unit 78 comprises a liquid crystal display (hereinafter referred to as the LCD) and the like, and is used for displaying a through image, a photographed image, various setting menus, and the like. The control unit 70 controls processing carried out by each of the units. The internal memory 79 stores a control program, image data, and the like.

The functions of the image input means 1 in FIG. 2 are realized by the imaging unit 71 and the A/D conversion unit 72. Likewise, the functions of the image correction means 2 are realized by the image processing unit 73 while the functions of the image manipulation means 3 are realized by the image processing unit 73, the operation unit 76, and the display unit 78. The functions of the image output means 4 are realized by the media recording unit 77. All of the functions described above are realized under control of the control unit 70, by using the internal memory 79 in addition.

Operation of the digital camera and a flow of processing therein are described next.

The imaging unit 71 causes light entering the lens from a subject to form an image on a photoelectric surface of the CCD when a photographer fully presses a shutter button. After photoelectric conversion, the imaging unit 71 outputs an analog image signal, and the A/D conversion unit 72 converts the analog image signal output from the imaging unit 71 to a digital image signal. The A/D conversion unit 72 then outputs the digital image signal as the digital image data P0. In this manner, the imaging unit 71 and the A/D conversion unit 72 function as the image input means 1.

Thereafter, the image processing unit 73 carries out gradation correction processing, density correction processing, color correction processing, and white balance adjustment processing in addition to the sharpness adjustment processing of the present invention, and outputs corrected image data P1. In this manner, the image processing unit 73 functions as the image correction means 2. For the sharpness adjustment processing, the control unit 70 starts a program for sharpness adjustment stored in the internal memory 79, and causes the image processing unit 73 to carry out the sharpness adjustment processing using the mathematical model M stored in advance in the internal memory 79, as has been described above.

The image P1 is displayed on the LCD of the display unit 78. As a manner of this display can be used display of thumbnail images as shown in FIG. 3A. While operating the operation buttons of the operation unit 76, the photographer selects and enlarges one of the images to be processed, and carries out selection from a menu for further manual image correction or manipulation. Processed image data P2 are then output. In this manner, the functions of the image manipulation means 3 are realized.

The compression/decompression unit 74 carries out compression processing on the image data P2 according to a compression format such as JPEG, and the compressed image data are written via the media recording unit 77 in a memory card inserted in the digital camera. In this manner, the functions of the image output means 4 are realized.

By installing the sharpness adjustment processing of the present invention as the image processing function of the digital camera, the same effect as in the case of the digital photograph printer can be obtained.

The manual correction and manipulation may be carried out on the image having been stored in the memory card. More specifically, the compression/decompression unit 74 decompresses the image data stored in the memory card, and the image after the decompression is displayed on the LCD of the display unit 78. The photographer selects desired image processing as has been described above, and the image processing unit 73 carries out the selected image processing.

Furthermore, the mathematical models for respective properties of subjects described by FIG. 12 may be installed in the digital camera. In addition, the processing for generating the mathematical model described by FIG. 5 may be installed therein. A person as a subject of photography is often fixed to some degree for each digital camera. Therefore, if the mathematical model is generated for the face of each individual as a frequent subject of photography with the digital camera, the model can be generated without variation of individual difference in face. Consequently, the sharpness adjustment processing can be carried out with extremely high accuracy for the face of the person.

A program for causing a personal computer or the like to carry out the sharpness adjustment processing of the present invention may be incorporated with image editing software. In this manner, a user can use the sharpness adjustment processing of the present invention as an option of image editing and manipulation on his/her personal computer, by installation of the software from a recording medium such as a CD-ROM to the personal computer, or by installation of the software through downloading of the software from a predetermined Web site on the Internet.

What is claimed is:

1. An image processing method comprising the steps of:
obtaining a weighting parameter for a statistical characteristic quantity representing a degree of sharpness in a predetermined structure in an input image by fitting a model representing the structure to the structure in the input image, the model obtained by carrying out predetermined statistical processing on a plurality of images representing the predetermined structure in different degrees of sharpness, and the model representing the structure by one or more statistical characteristic quantities including the statistical characteristic quantity representing the degree of sharpness and by weighting parameter or parameters for weighting the statistical characteristic quantity or quantities according to an individual characteristic of the structure;
adjusting sharpness in at least a part of the input image according to a value of the obtained weighting parameter; and
generating an output image in at least the part of which sharpness has been adjusted.

2. An image processing apparatus comprising:
parameter acquisition means for obtaining a weighting parameter for a statistical characteristic quantity representing a degree of sharpness in a predetermined structure in an input image by fitting a model representing the structure to the structure in the input image, the model obtained by carrying out predetermined statistical processing on a plurality of images representing the predetermined structure in different degrees of sharpness, and the model representing the structure by one or more statistical characteristic quantities including the statistical characteristic quantity representing the degree of sharpness and by weighting parameter or parameters for weighting the statistical characteristic quantity or quantities according to an individual characteristic of the structure; and
sharpness adjustment means for carrying out sharpness adjustment in at least a part of the input image according to a value of the weighting parameter obtained by the parameter acquisition means.

3. The image processing apparatus according to claim 2, wherein the sharpness adjustment means carries out the sharpness adjustment in a region of the predetermined structure by changing the value of the weighting parameter for the characteristic quantity representing the degree of sharpness.

4. The image processing apparatus according to claim 2, wherein the sharpness adjustment means carries out the sharpness adjustment at processing strength based on the degree of sharpness of the structure corresponding to the value of the weighting parameter for the statistical characteristic quantity representing the degree of sharpness.

5. The image processing apparatus according to claim 2, wherein the sharpness adjustment means carries out as the sharpness adjustment at least either sharpness enhancement processing on a region of the predetermined structure in the input image or sharpness reduction processing on a region other than the region of the predetermined structure.

6. The image processing apparatus according to claim 2, wherein the sharpness adjustment means carries out the sharpness adjustment in the predetermined structure and in a region neighboring the predetermined structure and having the same color as the predetermined structure.

7. The image processing apparatus according to claim 2, wherein the sharpness adjustment means carries out the sharpness adjustment in a region where the sharpness adjustment is carried out, in such a manner that a degree of the adjustment becomes progressively smaller toward a region where the adjustment is not carried out.

8. The image processing apparatus according to claim 2 further comprising detection means for detecting the structure in the input image, wherein
the parameter acquisition means obtains the weighting parameter by fitting the model to the structure having been detected.

9. The image processing apparatus according to claim 2 further comprising selection means for obtaining at least one property of the structure in the input image and for selecting the model corresponding to the obtained property from a plurality of the models representing the structure for respective properties of the predetermined structure, wherein
the parameter acquisition means obtains the weighting parameter by fitting the selected model to the structure in the input image.

10. The image processing apparatus according to claim 2, wherein the predetermined structure is a human face.

11. The image processing apparatus according to claim 2, wherein the model and the fitting of the model are realized by a method of Active Appearance Model.

12. A computer-readable recording medium storing an image processing program causing a computer to function as:

parameter acquisition means for obtaining a weighting parameter for a statistical characteristic quantity representing a degree of sharpness in a predetermined structure in an input image by fitting a model representing the structure to the structure in the input image, the model obtained by carrying out predetermined statistical processing on a plurality of images representing the predetermined structure in different degrees of sharpness, and the model representing the structure by one or more statistical characteristic quantities including the statistical characteristic quantity representing the degree of sharpness and by weighting parameter or parameters for weighting the statistical characteristic quantity or quantities according to an individual characteristic of the structure; and sharpness adjustment means for adjusting sharpness in at least a part of the input image according to a value of the weighting parameter obtained by the parameter acquisition means.

* * * * *